US012595072B2

(12) United States Patent
Legras et al.

(10) Patent No.: US 12,595,072 B2
(45) Date of Patent: Apr. 7, 2026

(54) AIRCRAFT PROVIDED WITH AN ENGINE AND AN EXHAUST DUCT THAT IS DRAINED AROUND AN EXHAUST NOZZLE OF THE ENGINE

(71) Applicant: AIRBUS HELICOPTERS, Marignane (FR)

(72) Inventors: Guillaume Legras, Velaux (FR); Patrick Fort, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/233,965

(22) Filed: Aug. 15, 2023

(65) Prior Publication Data

US 2024/0109666 A1 Apr. 4, 2024

(30) Foreign Application Priority Data

Sep. 27, 2022 (FR) ...................................... 2209784

(51) Int. Cl.

| | |
|---|---|
| *B64D 33/04* | (2006.01) |
| *F01D 25/30* | (2006.01) |
| *F02C 7/25* | (2006.01) |
| *B64D 45/00* | (2006.01) |

(Continued)

(52) U.S. Cl.
CPC ............. *B64D 33/04* (2013.01); *F01D 25/30* (2013.01); *F02C 7/25* (2013.01); *B64D 2045/009* (2013.01); *F01D 25/32* (2013.01); *F05D 2260/602* (2013.01); *F16N 31/002* (2013.01); *G10K 2210/1281* (2013.01)

(58) Field of Classification Search
CPC .... B64D 33/04; B64D 2045/009; A62C 3/08; F01D 25/30; F01D 25/32; F02C 7/25; F05D 2260/602; F16N 31/002
See application file for complete search history.

(56) References Cited

U.S. PATENT DOCUMENTS

| | | | |
|---|---|---|---|
| 2,949,736 | A | 8/1960 | Alexander |
| 4,163,366 | A | 8/1979 | Kent |
| 6,109,562 | A | 8/2000 | Crone |

(Continued)

FOREIGN PATENT DOCUMENTS

| | | |
|---|---|---|
| EP | 3798113 A1 | 3/2021 |
| EP | 3932801 A1 | 1/2022 |
| FR | 3098242 B1 | 6/2021 |

OTHER PUBLICATIONS

French Search Report for French Application No. FR2209784, Completed by the French Patent Office, Dated Apr. 21, 2023, 10 pages.

*Primary Examiner* — Phutthiwat Wongwian
*Assistant Examiner* — Rene D Ford
(74) *Attorney, Agent, or Firm* — BROOKS KUSHMAN P.C.

(57) ABSTRACT

An aircraft provided with an engine compartment, the aircraft comprising an engine at least partially housed in the engine compartment, the engine comprising an exhaust nozzle for at least discharging gases, the aircraft comprising an exhaust duct arranged around the exhaust nozzle, the exhaust duct having an open end opening into the engine compartment. The aircraft comprises a drainage device comprising a guide cooperating with the exhaust duct for collecting liquid flowing along the exhaust duct and exiting the exhaust duct through the end.

20 Claims, 2 Drawing Sheets

(51) Int. Cl.
  *F01D 25/32*        (2006.01)
  *F16N 31/00*        (2006.01)

(56)                References Cited

U.S. PATENT DOCUMENTS

2012/0023897 A1      2/2012  Dede et al.
2021/0403139 A1*   12/2021  Fink ......................... B64C 1/16

* cited by examiner

AIRCRAFT PROVIDED WITH AN ENGINE AND AN EXHAUST DUCT THAT IS DRAINED AROUND AN EXHAUST NOZZLE OF THE ENGINE

CROSS-REFERENCE TO RELATED APPLICATIONS

This application claims priority to French patent application No. FR 2209784 filed on Sep. 27, 2022, the disclosure of which is incorporated in its entirety by reference herein.

TECHNICAL FIELD

The present disclosure relates to an aircraft provided with an engine and an exhaust duct that is drained around an exhaust nozzle of the engine.

BACKGROUND

An aircraft, and, for example, a rotorcraft, may comprise an engine that discharges combustion gases through an exhaust nozzle.

The engine is conventionally housed in a compartment of the aircraft referred to as the "engine compartment". The engine compartment may be delimited by one or more firewalls and/or at least one cowling.

The aircraft may comprise an exhaust duct leading from the engine compartment to an environment outside the aircraft. This exhaust duct locally surrounds the exhaust nozzle. This exhaust duct may allow the combustion gases from the exhaust nozzle of an engine to be mixed with fresh air from the engine compartment and/or to be conveyed to preferred zones.

In the event of the engine failing to start, unburnt fuel may be discharged into the exhaust nozzle. Depending on the pitch and/or roll attitude of the aircraft, this unburnt fuel may fall by force of gravity into the exhaust duct and then into the engine compartment.

When the engine is subsequently started, walls of the engine compartment may reach relatively high temperatures. The presence of fuel on these hot walls and air in the engine compartment can cause a fire risk.

In this context, an engine compartment may be drained in order to discharge any flammable liquid from the engine compartment.

Document EP 3 932 801 A1 describes an aircraft provided with an engine compartment. The engine compartment is delimited, in particular, by a funnel-shaped fireproof transmission support platform. The funnel shape converges towards at least one internal collection point. Such a collection point may comprise a hole leading into a drainage piping.

Document EP 3 798 113 A1 is far removed from the disclosure, describing an airplane propulsion system. This propulsion system comprises a nacelle housing an engine and a drainage system. The drainage system comprises a drainage piping configured to convey liquid leaking from an engine component into a tank. A pressurized liquid source is used to pressurize the tank and convey the liquid to an outlet piping.

Similarly, document FR 3 098 242 B1 is far removed from the disclosure, describing a turbomachine. The turbomachine comprises an exhaust casing between a turbine and an exhaust nozzle of the turbomachine. The exhaust casing is surrounded by a nacelle used to fasten the turbomachine to an aircraft. The exhaust casing comprises an inner ring and an outer ring linked together by a plurality of structural arms. The outer ring comprises at least one liquid discharge hole opening into a liquid collector.

Document US 2012/023897 A1 is far removed from the disclosure, relating to an engine provided with drains.

Document U.S. Pat. No. 2,949,736 A describes an engine comprising a nozzle fastened to a conical exhaust structure by an extendible joint and a sump collecting fluid leaking through the joint.

Document U.S. Pat. No. 4,163,366 A describes an engine housed in a nacelle and an inner drainage hole.

Document U.S. Pat. No. 6,109,562 A is also known.

SUMMARY

An object of the present disclosure is thus to propose an innovative aircraft provided with an engine housed in an engine compartment intended to prevent fuel from running into the engine compartment in the event of the engine failing to start.

The disclosure relates to an aircraft provided with an engine compartment, said aircraft comprising an engine at least partially housed in the engine compartment, the engine comprising an exhaust nozzle for at least discharging gases, said aircraft comprising an exhaust duct arranged around the exhaust nozzle, the exhaust duct having an open end opening into the engine compartment.

The aircraft comprises a drainage device comprising a guide for collecting liquid flowing through the exhaust duct and exiting the exhaust duct through said end.

Therefore, the engine is provided with an exhaust nozzle, this exhaust nozzle extending partially into an exhaust duct of the aircraft. The exhaust nozzle may extend an engine block of the engine so as to discharge gases exiting this engine block. The exhaust duct is therefore effectively separate from the engine and is situated outside the engine. This exhaust duct therefore is not to be considered an internal part of an engine. The exhaust duct may be situated outside the engine compartment, the exhaust nozzle passing through a wall delimiting the engine compartment and leading into the space delimited by the exhaust duct. The exhaust nozzle may possibly not be in contact with the exhaust duct.

Therefore, the guide collects any liquid that may flow through the exhaust duct towards the engine compartment.

In particular, in the event of the engine failing to start, unburnt fuel may be discharged into the exhaust nozzle and may fall into the exhaust duct by force of gravity. This exhaust duct is a secondary nozzle and is not to be confused with an aircraft engine nacelle. As a result, depending on the pitch and/or roll of the aircraft, the unburnt fuel can flow towards the engine compartment, running by force of gravity along a peripheral wall of the exhaust duct.

The guide then collects this unburnt fuel when it exits through the end of the exhaust duct. The fuel is thus channeled before it can run down the walls of the engine compartment, or is discharged into a predetermined zone. The risks of the unburnt fuel running into the engine compartment are therefore reduced.

Therefore, in an aircraft that is likely to carry unburnt fuel into the engine compartment, in particular as a result of its inclination, the disclosure can limit the risks of unwanted fuel run-off, in particular after the engine has failed to start, for example during cold weather.

The disclosure is also relatively simple and may be implemented in a straightforward manner on an existing aircraft provided with an exhaust duct around an engine nozzle.

The aircraft may also include one or more of the following features.

According to one possibility, the guide may be arranged downstream of said end with respect to liquid flowing from the exhaust duct towards the guide, the guide collecting, by force of gravity, the liquid exiting the exhaust duct through said end when the aircraft is at predetermined roll and pitch angles.

The liquid, and, if applicable, the fuel flowing along the exhaust duct, is therefore collected before running down the walls of the engine compartment.

According to one possibility compatible with the preceding possibilities, the guide may be situated in the engine compartment.

According to one possibility compatible with the preceding possibilities, the guide may have a shape other than a ring shape. In this case, the guide does not extend 360 degrees around an axis.

According to one possibility compatible with the preceding possibilities, the guide may be fastened to the end or may extend partly under the end, or may even extend partly under the end while being arranged against a wall delimiting the engine compartment and carrying the exhaust duct.

According to one possibility compatible with the preceding possibilities, the guide may comprise a gutter delimiting a collection space, said collection space being configured to collect said liquid.

The term "gutter" denotes a receptacle suitable for collecting the liquid exiting through the end of the exhaust duct.

The gutter collects liquid running down the exhaust duct, by force of gravity, conveying it to a predetermined zone, in particular when the aircraft is at predetermined attitude angles.

The gutter may possibly be fastened to the exhaust duct, for example by gluing, riveting, screwing and/or welding. Alternatively, the gutter and the exhaust duct may form a one-piece component.

Alternatively, the gutter may be fastened to a wall delimiting the engine compartment, for example by gluing, riveting, screwing and/or welding.

According to one possibility compatible with the preceding possibilities, the drainage device may comprise at least one discharge hole that possibly emerges into the collection space, for discharging the liquid.

The guide may therefore be used to collect the liquid flowing through the exhaust duct towards the engine compartment, before discharging it in a predetermined risk-free zone through at least one discharge hole.

For example, since the guide may comprise a gutter, the discharge hole may be provided in the gutter.

The gutter conveys liquid running down the exhaust duct towards the discharge hole, by force of gravity, in particular when the aircraft is at predetermined attitude angles.

According to one possibility compatible with the preceding possibilities, the drainage device may comprise a discharge piping, that may be rigid and/or may open onto the guide.

The term "piping" denotes equipment that may comprise one or more pipes. The term "rigid" means that the discharge piping cannot be twisted by hand.

The liquid may then be discharged to a risk-free zone or even out of the aircraft through at least the discharge piping.

For example, since the guide may comprise a gutter, the discharge piping may be fastened to the gutter, or may even carry the gutter.

The drainage device may comprise standard fastening components for immobilizing the drainage piping in relation to a structure of the aircraft.

The discharge piping may possibly lead directly to a risk-free zone or out of the aircraft.

Alternatively, since the aircraft may comprise a drainage system for draining the engine compartment, the discharge piping may lead to the drainage system.

The drainage device may therefore allow the unburnt fuel present in the exhaust duct to be discharged by using the engine compartment drainage system, but without the fuel running into the engine compartment.

The discharge piping may therefore lead to the drainage system, being connected to this existing drainage system. According to another example, the discharge piping may open over a hole of such an existing drainage system so as to convey the drained liquid into the drainage system by force of gravity.

In addition to an aircraft, the disclosure also relates to a method for protecting such an aircraft provided with an engine compartment against the risk of fire, said aircraft comprising an engine at least partially housed in the engine compartment, the engine comprising an exhaust nozzle for at least discharging gases, said aircraft comprising an exhaust duct arranged around the exhaust nozzle, the exhaust duct having an open end opening into the engine compartment, fuel being discharged through said exhaust nozzle into the exhaust duct.

This method comprises the following steps: moving the fuel along a peripheral wall of the exhaust duct towards a guide, passing through said end, and collecting said fuel with said guide.

The method may comprise moving the fuel from the guide to a drainage system for draining the engine compartment.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
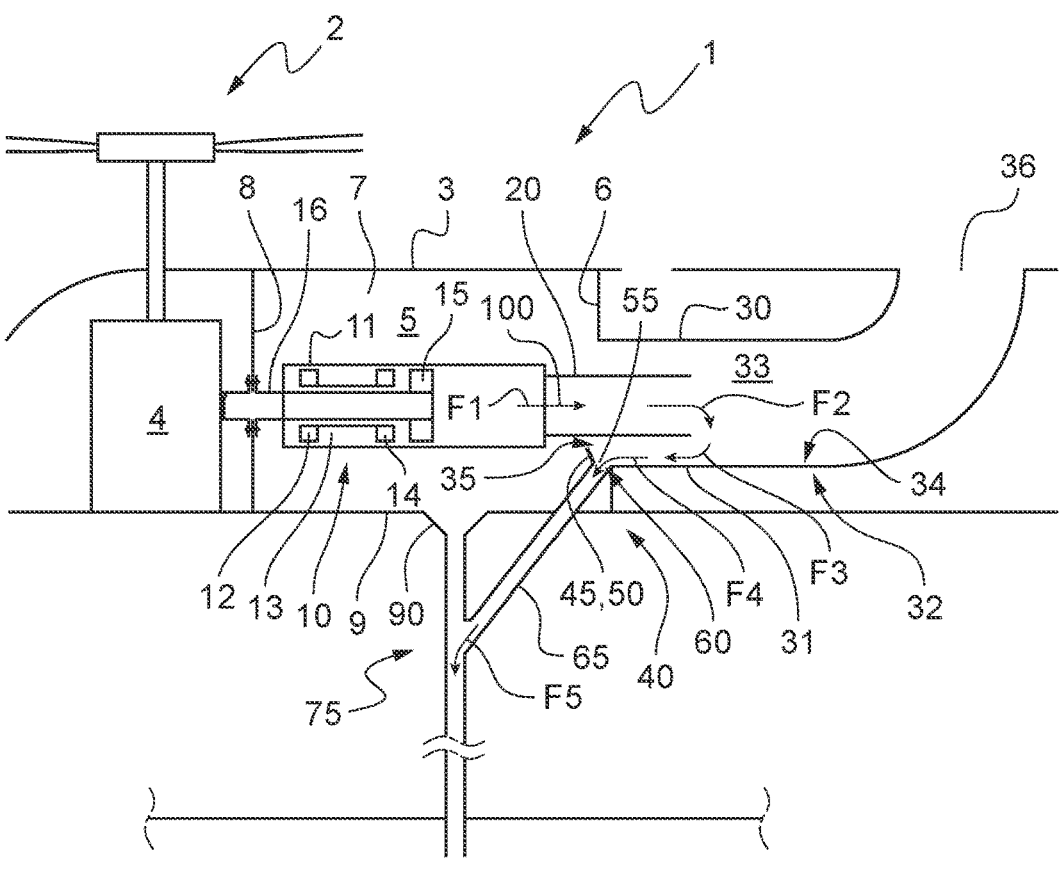
FIG. 1 is a schematic cross-sectional view of an aircraft according to the disclosure with a drainage device connected to a drainage system.

FIG. 1 shows an example of an aircraft 1 according to the disclosure.

Such an aircraft 1 according to the disclosure comprises an airframe 3 wherein there is at least one engine compartment 5. The engine compartment 5 is delimited by at least one wall 6, 7, 8, and 9. The wall or walls 6, 7, 8 and 9 may be firewalls, for example being fireproof. For example, the engine compartment 5 is delimited along a longitudinal axis by at least one longitudinal wall 6, 8. For example, the engine compartment 5 is delimited along a transverse axis by at least one transverse wall 7, and vertically at least by a bottom wall 9. According to the example shown, the aircraft 1 comprises a bottom wall 9 and a transverse wall 7 that extend between two longitudinal walls 6, 8.

The engine compartment 5 may possibly comprise a conventional drainage system 75. This drainage system 75 may comprise at least one hole 90 provided in the bottom wall 9, at least one piping, at least one inclined plane provided in the bottom wall 9, etc. The purpose of this drainage system 75 is to discharge liquid out of the engine compartment 5.

The aircraft 1 further comprises at least one engine 10. Such an engine 10 is housed at least partially in the engine compartment 5. For example, the engine 10 comprises an engine block 11. This engine block 11 may comprise a power shaft 16, connected to a mechanical power transmission channel 4, possibly by passing through a longitudinal wall 8. This mechanical power transmission channel 4 may set in motion at least one rotor and, for example, a rotary wing 2.

The engine 10 may be a heat engine suitable for burning a fuel in order to set the power shaft 16 in motion.

According to one possibility, the engine 10 may be a turboshaft engine. For example, the engine block 11 may then comprise a gas generator 17 provided with a compressor assembly 12, a combustion chamber 13 and an assembly comprising at least one expansion turbine 14 constrained to rotate with the compressor assembly 12. Moreover, the engine 10 may comprise at least one free turbine 15 downstream of the expansion turbine or turbines 14. The free turbine or turbines 15 are mechanically connected to the power shaft 16.

Alternatively, the engine 10 may be a piston engine, for example.

Irrespective of the nature of the engine 10, this engine 10 comprises an exhaust nozzle 20 for at least discharging gases resulting from the combustion of the fuel. The exhaust nozzle may extend the engine block. For example, the nozzle is located downstream of the free turbine 15 in the direction of flow of the gases resulting from the combustion of the fuel. For example, the exhaust nozzle 20 passes through a longitudinal wall 6.

Moreover, the aircraft 1 is provided with an exhaust duct 30. The exhaust duct 30 surrounds the exhaust nozzle 20, i.e., the whole of the exhaust nozzle 20 or part of the exhaust nozzle 20. The exhaust duct 30 is thus independent of the engine 10 and is situated outside the engine 10. As shown, the exhaust duct 30 may be situated outside the engine compartment 5. For example, the exhaust duct 30 surrounds at least a part of the exhaust nozzle 20 situated outside the engine compartment 5.

The exhaust duct 30 extends from an open end 35 opening into the engine compartment 5 to an open end zone 36. Air present in the compartment 5 may thus be sucked into the exhaust duct 30. For example, the end zone 36 opens on an environment EXT situated outside the aircraft 1.

Moreover, the exhaust duct 30 may comprise a peripheral wall 31. The peripheral wall 31 delimits an inner volume 33 situated inside the exhaust duct 30 and accommodating at least one section of the exhaust nozzle 20.

The peripheral wall 31 extends in thickness from an outer face 32 to an inner face 34, this inner face 34 facing the exhaust nozzle 20.

The exhaust duct 30 may be a one-piece component or may comprise several components fastened together. The peripheral wall 31 may thus be a one-piece component or may comprise several components fastened together.

The aircraft 1 moreover comprises a drainage device 40 that has the purpose of draining liquid running in the exhaust duct 30.

The drainage device 40 is provided with a guide 45. This guide 45 is configured to form a channel and collect liquid 100 flowing along the inner face 34 of the exhaust duct 30 and exiting through the end 35.

For this purpose, the guide 45 may be formed near the end 35. The guide 45 may be arranged downstream of the end 35 in relation to the liquid 100 exiting the exhaust duct through this end 35. In other words, the liquid 100 exiting the end 35 falls into the guide 45 by force of gravity. For example, the guide 45 is fastened to the end 35, possibly in a sealed manner, or extends partly under the end 35, for example being arranged against a wall 6 of the engine compartment 5 carrying the exhaust duct 30.

The guide 45 may therefore be arranged in the engine compartment 5.

According to the example shown, the guide 45 has a shape other than a ring shape.

For example, the guide 45 comprises a gutter 50.

As a result, the gutter 50 delimits a collection space 55. This collection space 55 therefore makes it possible to collect, by force of gravity, liquid 100 running on the inner face 34 of the peripheral wall 31 and flowing through the end 35, when the aircraft is at predetermined roll and pitch angles.

The gutter 50 may bear against the end 35 of the exhaust duct 30 or be under the end 35 in order to collect, by force of gravity, the liquid exiting the exhaust duct by running out through the end 35.

In particular, the gutter 50 may be fastened to the exhaust duct 30 or to a wall 6 of the engine compartment 30, or may form a one-piece component with this exhaust duct 30 or this wall 6.

Figure 2:
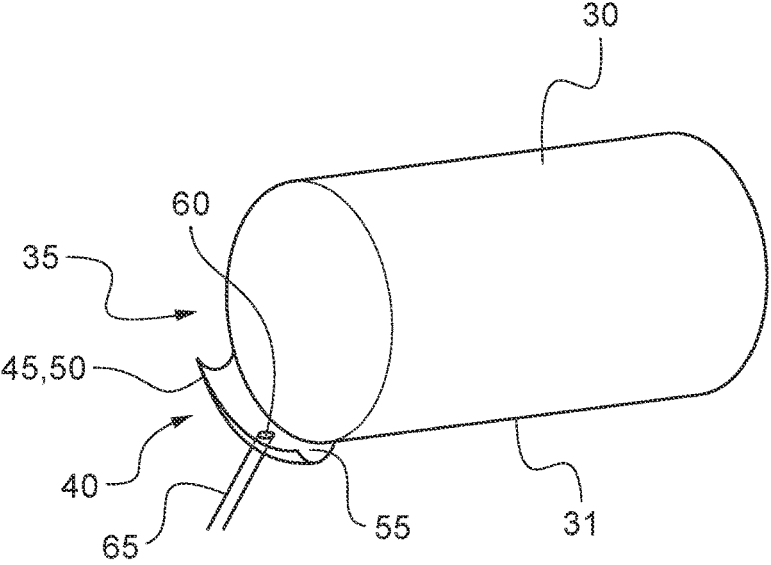
FIG. 2 is a schematic isometric view of a guide according to the disclosure.

FIG. 2 shows a gutter 50.

In reference to FIG. 1, the guide 45 may be provided with at least one discharge hole 60 for discharging the collected liquid 100. Such a discharge hole 60 may open into the collection space 55 so that liquid collected in the collection space 55 exits the collection space 55 through this discharge hole 60.

Therefore, at least one discharge hole 60 may be provided in the gutter 50.

The drainage device 40 may possibly be provided with at least one discharge piping 65 opening into the collection space via a discharge hole 60.

Therefore, at least one discharge piping 65 is fastened to the gutter 50. The discharge piping 65 is possibly fastened to a load-bearing structure of the aircraft, or to a wall of the engine compartment 5. The discharge piping 65 may carry the gutter 50.

According to another aspect, at least one discharge piping 65 may open into the drainage system 75, if applicable.

According to the example of FIG. 1, the discharge piping 65 may be hydraulically connected to the drainage system 75. The discharge piping 35 may possibly pass through a wall of the engine compartment, for example the bottom wall 9, to join a piping of the drainage system.

Figure 3:
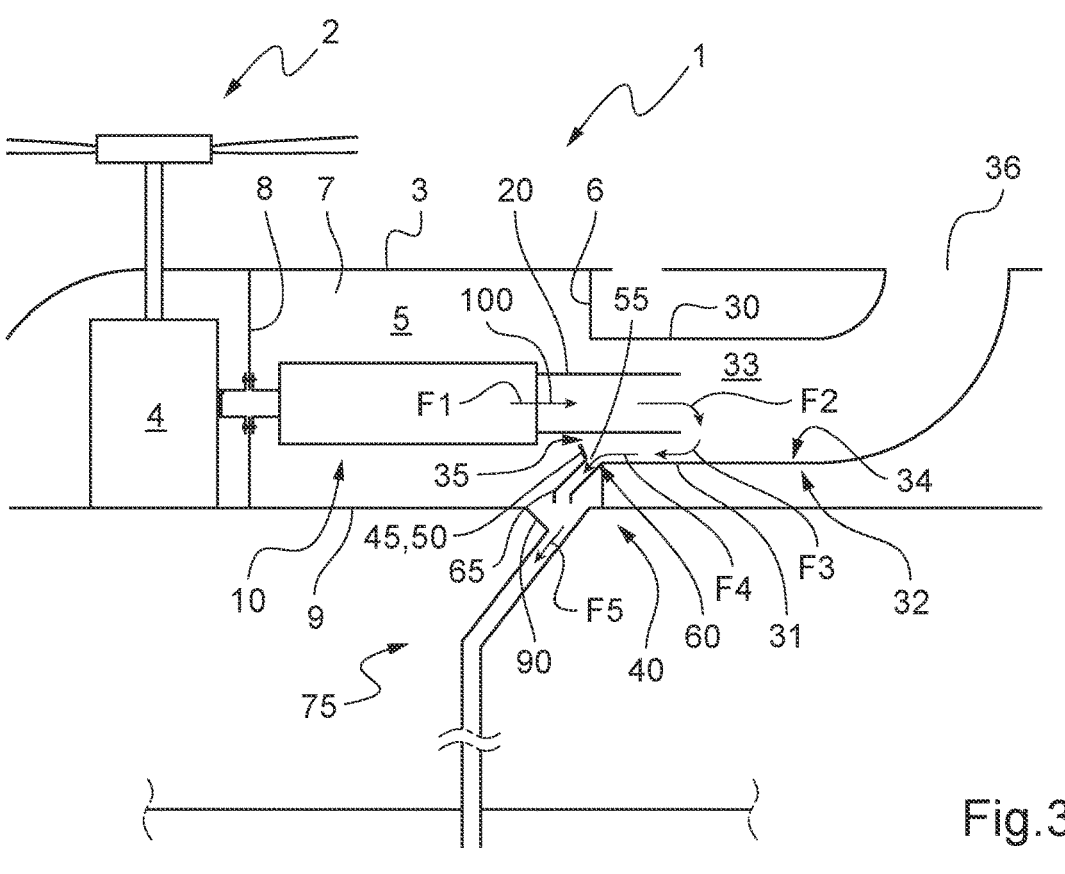
FIG. 3 is a schematic cross-sectional view of an aircraft according to the disclosure with a drainage device leading to a hole of a drainage system.
Figure 4:
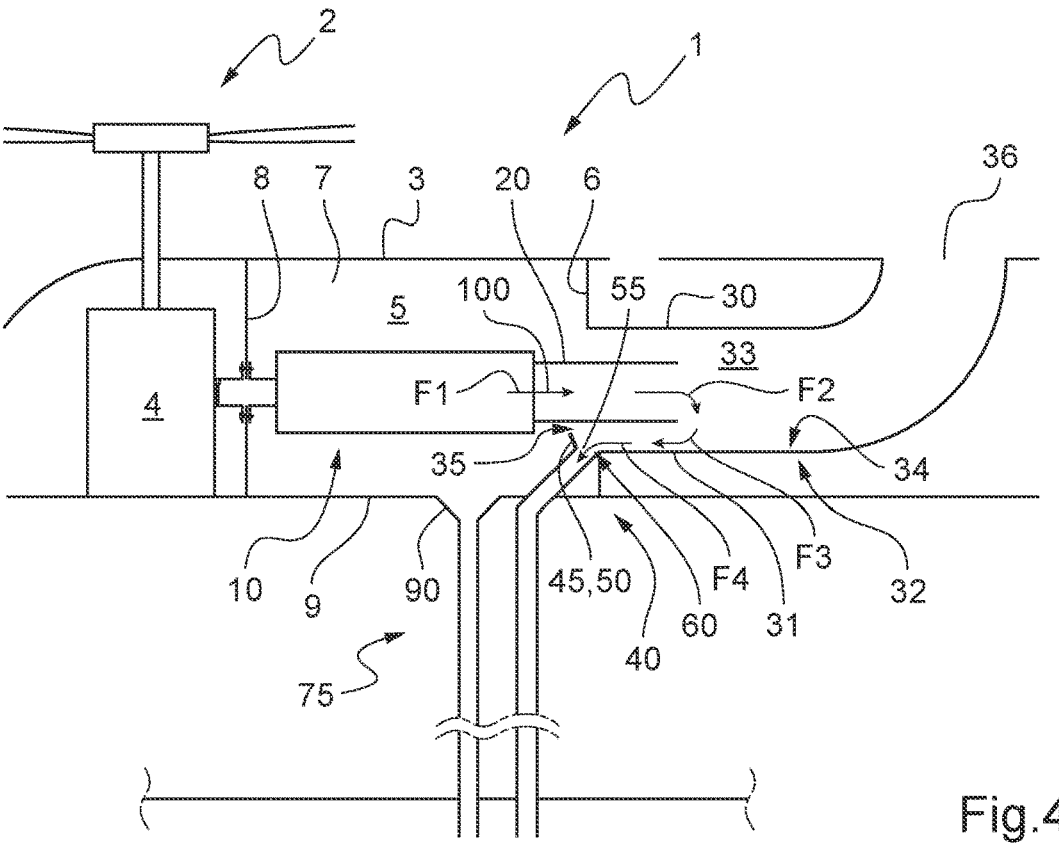
FIG. 4 is a schematic cross-sectional view of an aircraft according to the disclosure with a drainage device leading to a predetermined zone.

According to the example of FIG. 3, the discharge piping 65 may lead to a hole 90 of the drainage system 75. For example, the discharge piping 65 opens above a hole 90 provided in a bottom wall 9 of the engine compartment, this hole 90 being connected to a piping of the drainage system 75.

According to another variant, the discharge piping 65 may lead to a predetermined risk-free zone without passing through the drainage system 75.

A variant that minimizes the total weight of the installation may be preferred.

In these conditions, the drainage device 40 may tend to reduce the fire risk in specific conditions.

An engine 5 may fail to start for numerous reasons. In such a scenario, unburnt fuel may be discharged into the exhaust nozzle 20 in the direction shown by the arrow F1. This unburnt fuel may then fall by force of gravity into the exhaust duct 30 in the direction shown by the arrow F2.

Depending on the pitch and roll angle of the aircraft 1, this unburnt fuel may be moved by force of gravity towards the engine compartment 5 in the direction shown by the arrow F3.

The unburnt fuel flows, in particular, along the peripheral wall 31, and, in particular, along its inner face 34.

The guide 45 therefore helps collect this unburnt fuel in the direction shown by the arrow F4 before the unburnt fuel runs in an undesirable manner onto the walls of the engine compartment 5. If applicable, the unburnt fuel is discharged by force of gravity through the discharge piping or piping's 65 and then, according to the variants of FIGS. 1 and 3, through the drainage system 75, in the direction shown by the arrow F5. The risks of unburnt fuel lying in the bottom of the engine compartment 5 are therefore reduced.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. An aircraft provided with an engine compartment, the aircraft comprising an engine at least partially housed in the engine compartment, the engine comprising an exhaust nozzle for at least discharging gases, the aircraft comprising an exhaust duct arranged around the exhaust nozzle, the exhaust duct having an open end opening into the engine compartment, wherein the aircraft comprises a drainage device comprising a guide for collecting liquid flowing along the exhaust duct and exiting the exhaust duct through the open end, the drainage device comprising at least one discharge hole for discharging the liquid, the exhaust nozzle extending only partially through the exhaust duct such that liquids the liquid exiting an outlet of the exhaust nozzle can collect in the exhaust duct before flowing into the guide.

2. The aircraft according to claim 1, wherein the guide is arranged downstream of the open end with respect to the liquid flowing from the exhaust duct towards the guide, the guide collecting, by force of gravity, the liquid exiting the exhaust duct through the open end when the aircraft is at predetermined roll and pitch angles.

3. The aircraft according to claim 1, wherein the guide is arranged in the engine compartment.

4. The aircraft according to claim 1, wherein the guide comprises a gutter delimiting a collection space, the collection space being configured to collect the liquid.

5. The aircraft according to claim 4, wherein the gutter is fastened to the exhaust duct or forms a one-piece component with the exhaust duct.

6. The aircraft according to claim 1, wherein, the guide comprising a gutter, the discharge hole is provided on the gutter.

7. The aircraft according to claim 1, wherein the drainage device comprises a discharge piping.

8. The aircraft according to claim 7, wherein, the guide comprising a gutter, the discharge piping is fastened to the gutter.

9. The aircraft according to claim 7, wherein the aircraft comprises a drainage system for draining the engine compartment, the discharge piping leading to the drainage system.

10. The aircraft according to claim 1, wherein the exhaust duct is independent of the engine and is situated outside the engine.

11. The aircraft according to claim 1, wherein the exhaust duct is situated outside the engine compartment, the exhaust nozzle passing through a wall delimiting the engine compartment.

12. The aircraft according to claim 1, wherein the engine comprises an engine block extended by the exhaust nozzle.

13. The aircraft according to claim 1, wherein the guide has a shape other than a ring shape.

14. The aircraft according to claim 1, wherein the guide is fastened to the open end or extends partly under the open end, or extends partly under the open end while being arranged against a wall delimiting the engine compartment and carrying the exhaust duct.

15. A method for protecting an aircraft provided with an engine compartment against the risk of fire, the aircraft comprising an engine at least partially housed in the engine compartment, the engine comprising an exhaust nozzle for at least discharging gases, the aircraft comprising an exhaust duct arranged around the exhaust nozzle, the exhaust duct having an open end opening into the engine compartment, fuel being discharged through the exhaust nozzle into the exhaust duct, wherein the method comprises the following steps: moving the fuel along a peripheral wall of the exhaust duct towards a guide, passing through the open end, and collecting the fuel with the guide, wherein the exhaust nozzle extends only partially through the exhaust duct such that liquids the fuel exiting an outlet of the exhaust nozzle can collect in the exhaust duct before flowing into the guide.

16. The method according to claim 15, wherein the method comprises moving the fuel from the guide towards a drainage system for draining the engine compartment.

17. An aircraft provided with an engine compartment, the aircraft comprising an engine at least partially housed in the engine compartment, the engine comprising an exhaust nozzle for at least discharging gases, the aircraft comprising an exhaust duct arranged around the exhaust nozzle, the exhaust duct having an open end opening into the engine compartment, wherein the aircraft comprises a drainage device comprising a guide for collecting liquid flowing along the exhaust duct and exiting the exhaust duct through the open end, the drainage device comprising at least one discharge hole for discharging the liquid, wherein the exhaust nozzle extends only partially through the exhaust duct such that liquids the liquid exiting an outlet of the exhaust nozzle can collect in the exhaust duct before flowing into the guide, wherein the guide is arranged in the engine compartment, and wherein the exhaust duct is situated outside the engine compartment, the exhaust nozzle passing through a wall delimiting the engine compartment.

18. The aircraft according to claim 17, wherein the guide is arranged downstream of the open end with respect to the liquid flowing from the exhaust duct towards the guide, the guide collecting, by force of gravity, the liquid exiting the exhaust duct through the open end when the aircraft is at predetermined roll and pitch angles.

19. The aircraft according to claim 17, wherein, the guide comprising a gutter, and the discharge hole is provided on the gutter.

20. The aircraft according to claim 17, wherein the guide comprises a gutter delimiting a collection space, the collection space being configured to collect the liquid.

\* \* \* \* \*